United States Patent
Gao et al.

(10) Patent No.: US 10,530,675 B2
(45) Date of Patent: Jan. 7, 2020

(54) VIDEO QUALITY ESTIMATION METHOD AND APPARATUS

(71) Applicant: Huawei Technologies Co., Ltd., Shenzhen (CN)

(72) Inventors: Shan Gao, Shenzhen (CN); Fuzheng Yang, Xi'an (CN); Ziqiang Xu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 46 days.

(21) Appl. No.: 15/796,035

(22) Filed: Oct. 27, 2017

(65) Prior Publication Data
US 2018/0054369 A1    Feb. 22, 2018

Related U.S. Application Data (63) Continuation of application No. PCT/CN2016/075489, filed on Mar. 3, 2016.

(30) Foreign Application Priority Data

Apr. 28, 2015    (CN) .......................... 2015 1 0208427

(51) Int. Cl.
| | |
|---|---|
| *H04L 12/26* | (2006.01) |
| *H04L 29/06* | (2006.01) |
| *H04N 17/00* | (2006.01) |

(52) U.S. Cl.
CPC .......... *H04L 43/0829* (2013.01); *H04L 65/60* (2013.01); *H04L 65/80* (2013.01); *H04N 17/004* (2013.01)

(58) Field of Classification Search
CPC ..... H04L 43/0829; H04L 65/60; H04L 65/80; H04N 17/004; H04N 17/00
See application file for complete search history.

(56) References Cited

U.S. PATENT DOCUMENTS

| | | | |
|---|---|---|---|
| 2009/0041114 A1* | 2/2009 | Clark | .................. H04L 43/0829 375/240.01 |
| 2015/0110204 A1 | 4/2015 | Sun et al. | |

FOREIGN PATENT DOCUMENTS

| | | |
|---|---|---|
| CN | 101227604 A | 7/2008 |
| CN | 101742353 A | 6/2010 |

(Continued)

OTHER PUBLICATIONS

International Telecommunication Union, "Parametric non-intrusive bitstream assessment of video media streaming quality—Lower resolution application area," Series P: Terminals and Subjective and Objective Assessment Methods—Models and tools for quality assessment of streamed media; ITU-T P.1202.1, Telecommunication Standardization Sector of ITU (Oct. 2012), 62 pages.

(Continued)

*Primary Examiner* — Steven H Nguyen
(74) *Attorney, Agent, or Firm* — Slater Matsil, LLP (57) ABSTRACT

A video data quality estimation method and apparatus are provided. The video data quality estimation method includes: obtaining a parameter used to obtain video quality of the video, where the parameter used to obtain video quality of the video includes at least one of a content complexity factor of the video, an average video frame impairment rate of the video, a sequence impairment rate of the video, or a packet-loss event frequency of the video; and obtaining quality of the video according to the parameter used to obtain video quality of the video.

8 Claims, 2 Drawing Sheets

(56) References Cited

FOREIGN PATENT DOCUMENTS

| CN | 103414915 A | 11/2013 |
| CN | 103634594 A | 3/2014 |
| CN | 104811694 A | 7/2015 |
| EP | 2106153 A1 | 9/2009 |
| EP | 2229001 A1 | 9/2010 |
| EP | 2648415 A1 | 10/2013 |
| EP | 2790407 A1 | 10/2014 |
| EP | 2858364 A1 | 4/2015 |
| JP | 2005244851 A | 9/2005 |
| WO | 2006099082 A2 | 9/2006 |
| WO | 2011072414 A1 | 6/2011 |

OTHER PUBLICATIONS

International Telecommunication Union, "The E-model: a computational model for use in transmission planning," Series G: Transmission Systems and Media, Digital Systems and Networks; International telephone connections and circuits—Transmission planning and the E-model; ITU-T G.107; Telecommunication Standardization Sector of ITU (Feb. 2014), 30 pages.

International Telecommunication Union, "Estimating end-to-end performance in IP networks for data applications," Series G: Transmission Systems and Media, Digital Systems and Networks; Multimedia Quality of Service and performance—Generic and user-related aspects; ITU-T G.1030; Telecommunication Standardization Sector of ITU (Feb. 2014), 30 pages.

International Telecommunication Union, "Opinion model for video-telephony applications," Series G: Transmission Systems and Media, Digital Systems and Networks; Multimedia Quality of Service and performance—Generic and user-related aspects; ITU-T G.1070; Telecommunication Standardization Sector of ITU (Jul. 2012), 30 pages.

Raake, A. et al., "T-V-Model: Parameter-Based Prediction of IPTV Quality," IEEE International Conference on Acoustics, Speech and Signal Processing (ICASSP), Mar. 31-Apr. 4, 2008, pp. 1149-1152.

Pinson, M.H. et al., "The History of Video Quality Model Validation," IEEE 15th International Workshop on Multimedia Signal Processing (MMSP), Sep. 30-Oct. 2, 2013, Pula (Sardinia), Italy, pp. 458-463.

Jiarun, S., "Research on User's QoE Evaluation for Network Video Services," Dissertation submitted to Xidian University in partial fulfillment of the requirements for the degree of Doctor of Philosophy in Communications and Information Systems, vol. 47, No. 6, Sep. 2015,149 pages . . . With English abstract.

International Telecommunication Union, "Parametric non-intrusive assessment of audiovisual media streaming quality—Amendment 2: New Appendix III—Use of ITU-T P.1201 for non-adaptive, progressive download type media streaming," Series P: Terminals and Subjective and Objective Assessment Methods—Models and tools for quality assessment of streamed media; ITU-T P.1201, Amendment 2; Telecommunication Standardization Sector of ITU (Dec. 2013), 28 pages.

International Telecommunication Union, "Parametric non-intrusive bitstream assessment of video media streaming quality," Series P: Terminals and Subjective and Objective Assessment Methods—Models and tools for quality assessment of streamed media; ITU-T P.1202; Telecommunication Standardization Sector of ITU (Oct. 2012), 26 pages.

* cited by examiner

VIDEO QUALITY ESTIMATION METHOD AND APPARATUS

CROSS-REFERENCE TO RELATED APPLICATIONS

This application is a continuation of International Application No. PCT/CN2016/075489, filed on Mar. 3, 2016, which claims priority to Chinese Patent Application No. 201510208427.5, filed on Apr. 28, 2015. The disclosures of the aforementioned applications are hereby incorporated by reference in their entireties.

TECHNICAL FIELD

The present disclosure relates to the field of digital signal processing technologies, and in particular, to a video data quality estimation method and apparatus.

BACKGROUND

With development of communications technologies and computer network technologies, networks have been widely applied to people's daily life and work. More people send and receive texts, voices, and image and video information anytime anywhere over networks. As video information, by virtue of a visually vivid characteristic, provides people with richest content, network video services grow rapidly. The network video services such as videophones, video conferences, and Internet Protocol televisions (IPTV) play increasingly important roles in people's daily life and work. To provide better video service quality, objective estimation criteria for network video quality attract attentions of researchers.

A network planning layer planning model predicts quality of a transmitted video according to a network and a video parameter. The model is generally applied to network planning, and in a case of a given network status, predicts video quality obtained when video streams with different encoding parameters are transmitted. Therefore, network parameters can be appropriately planned by using the planning layer model, so as to obtain better service quality. However, for a specified video bitstream, if a specific parameter of the video bitstream can be obtained, the model may also be used to perform quality monitoring on the specified video stream.

In the prior art, statistic data may be obtained by obtaining packet header information and then parsing a packet header, so as to perform quality estimation. The model calculates video quality due to encoding V_MOSC by using a parameter including a video content complexity factor (Video content complexity factor, V_CCF), and uses the quality due to encoding as video quality.

Considering that video quality is further affected by a packet loss, packet loss impact may be further added to the model. Therefore, video quality due to packet-loss is used as the video quality, and the video quality due to packet-loss V_MOSP is:

$$V\_MOSP = V\_MOSC - V\_DP,$$

where V_DP is video distortion due to packet-loss; a packet header needs to be parsed when V_DP is being calculated; packet loss information is obtained by analyzing packet header information; and the following packet loss parameters are obtained by means of statistics collection: an average video frame impairment rate V_AIRF, a sequence impairment rate V_IR, and a packet-loss event frequency V_PLEF.

The model may further obtain video quality due to rebuffering V_MOSR based on the video quality due to encoding and/or the video quality due to packet-loss, and then use the quality due to rebuffering as the video quality.

In some application scenarios including the network planning layer, a specific video stream is unavailable. Therefore, specific statistic parameters relating to the specific video stream, such as parameters but not limited to a V_CCF, a V_PLEF, a V_AIRF, and a V_IR, are unavailable. Therefore, for an application scenario in which a specific video stream is unavailable and video data quality estimation needs to be performed, a new model is required for video quality estimation.

SUMMARY

Embodiments of the present disclosure provide a video data quality estimation method and apparatus, so as to resolve a problem that video data quality estimation cannot be performed in an application scenario in which a specific video stream is unavailable.

A first aspect of the present disclosure provides a video data quality estimation method. The method includes obtaining a parameter used to obtain video quality of a video, where the parameter used to obtain video quality of the video includes at least one of a content complexity factor of the video, an average video frame impairment rate of the video, a sequence impairment rate of the video, or a packet-loss event frequency of the video. The method also includes obtaining quality of the video according to the parameter used to obtain video quality of the video. The obtaining a parameter used to obtain video quality of the video includes: obtaining a bit rate of the video, and calculating the content complexity factor by using the bit rate; and/or obtaining a packet loss rate of the video and an average quantity of packets included in each frame of the video, and calculating the average video frame impairment rate by using the packet loss rate and the average quantity of packets included in each frame; and/or obtaining a length of a group of pictures of the video, obtaining a frame loss rate of the video, and calculating the sequence impairment rate by using the length of the group of pictures and the frame loss rate; and/or obtaining a total packet quantity of a sequence of the video and the packet loss rate of the video, and calculating the packet-loss event frequency by using the total packet quantity of the sequence and the packet loss rate.

With reference to the first aspect, in a first possible implementation of the first aspect, the calculating the content complexity factor by using the bit rate includes: calculating the content complexity factor according to the following formula:

$$V\_CCF = \begin{cases} a \ln V\_BR + b & \text{if } V\_BR < \text{Threshold} \\ c & \text{if } V\_BR \geq \text{Threshold} \end{cases},$$

where V_CCF is the content complexity factor, V_BR is the bit rate, a is a preset value, b is a preset value, c is a preset value, and Threshold is a preset value or a value obtained by multiplying a height of the video by a width of the video.

With reference to the first aspect or the first possible implementation of the first aspect, in a second possible implementation of the first aspect, the calculating the average video frame impairment rate by using the packet loss rate and the average quantity of packets included in each frame includes: calculating the average video frame impairment rate according to the following formula:

$$V\_AIRF = \frac{1}{1-(1-V\_LossRate)^{V\_PktpF}} - \frac{1-V\_LossRate}{V\_LossRate \times V\_PktpF},$$

where

V_AIRF is the average video frame impairment rate, V_PktpF is the average quantity of packets included in each frame, and V_LossRate is the packet loss rate.

With reference to the first aspect or the first or the second possible implementation of the first aspect, in a third possible implementation of the first aspect, the calculating the sequence impairment rate by using the length of the group of pictures and the frame loss rate includes: calculating the sequence impairment rate according to the following formula:

$$V\_IR = 1 - \frac{(1-V\_LossRateFrame)}{V\_LossRateFrame \times GopLength} \times (1-(1-V\_LossRateFrame)^{GopLength}),$$

where

V_IR is the sequence impairment rate, V_LossRateFrame is the frame loss rate, and Goplength is the length of the group of pictures.

With reference to any one of the first aspect or the first to the third possible implementations of the first aspect, in a fourth possible implementation of the first aspect, the calculating the packet-loss event frequency by using the total packet quantity of the sequence and the packet loss rate includes calculating the packet-loss event frequency according to the following formula:

$$V\_PLEF = \frac{TotalPktNum \times V\_LossRate}{V\_Burst},$$

where V_PLEF is the packet-loss event frequency, TotalPktNum is the total packet quantity of the sequence, V_LossRate is the packet loss rate, and V_Burst is a burst packet length of the video; or calculating the packet-loss event frequency according to the following formula:

$$V\_PLEF = \frac{TotalPktNum \times V\_LossRate}{V\_Burst} \times \frac{V\_Burst}{V\_PktpF} = \frac{TotalPktNum \times V\_LossRate}{V\_PktpF},$$

where

V_PLEF is the packet-loss event frequency, TotalPktNum is the total packet quantity of the sequence, V_LossRate is the packet loss rate, V_Burst is a burst packet length of the video, and V_PktpF is the average quantity of packets included in each frame.

With reference to any one of the first aspect or the first to the fourth possible implementations of the first aspect, in a fifth possible implementation of the first aspect, the average quantity of packets included in each frame is a ratio of the total packet quantity of the sequence of the video to a total frame quantity of the sequence of the video.

With reference to any one of the first aspect or the first to the fifth possible implementations of the first aspect, in a sixth possible implementation of the first aspect, the obtaining a frame loss rate of the video includes obtaining the packet loss rate and the average quantity of packets included in each frame, and calculating the frame loss according to the following formula:

$$V\_LossRateFrame = 1-(1-V\_LossRate)^{V\_PktpF},$$

where V_PktpF is the average quantity of packets included in each frame, V_LossRate is the packet loss rate, and V_LossRateFrame is the frame loss rate of the video.

A second aspect of the present disclosure provides a video data quality estimation apparatus. The apparatus includes an obtaining module, configured to obtain a parameter used to obtain video quality of the video, where the parameter used to obtain video quality of the video includes at least one of a content complexity factor of the video, an average video frame impairment rate of the video, a sequence impairment rate of the video, or a packet-loss event frequency of the video. The apparatus also includes a processing module, configured to obtain quality of the video according to the parameter that is used to obtain video quality of the video and that is obtained by the obtaining module. That the obtaining module obtains a parameter used to obtain video quality of the video includes: obtaining a bit rate of the video, and calculating the content complexity factor by using the bit rate; and/or obtaining a packet loss rate of the video and an average quantity of packets included in each frame of the video, and calculating the average video frame impairment rate by using the packet loss rate and the average quantity of packets included in each frame; and/or obtaining a length of a group of pictures of the video, obtaining a frame loss rate of the video, and calculating the sequence impairment rate by using the length of the group of pictures and the frame loss rate; and/or obtaining a total packet quantity of a sequence of the video and the packet loss rate of the video, and calculating the packet-loss event frequency by using the total packet quantity of the sequence and the packet loss rate.

With reference to the second aspect, in a first possible implementation of the second aspect, that the obtaining module calculates the content complexity factor by using the bit rate includes the obtaining module calculates the content complexity factor according to the following formula:

$$V\_CCF = \begin{cases} a\ln V\_BR + b & \text{If } V\_BR < \text{Threshold} \\ c & \text{If } V\_BR \geq \text{Threshold} \end{cases},$$

where V_CCF is the content complexity factor, V_BR is the bit rate, a is a preset value, b is a preset value, c is a preset value, and Threshold is a preset value or a value obtained by multiplying a height of the video by a width of the video.

With reference to the second aspect or the first possible implementation of the second aspect, in a second possible implementation of the second aspect, that the obtaining module calculates the average video frame impairment rate by using the packet loss rate and the average quantity of packets included in each frame includes the obtaining module calculates the average video frame impairment rate according to the following formula:

$$V\_AIRF = \frac{1}{1-(1-V\_LossRate)^{V\_PktpF}} - \frac{1-V\_LossRate}{V\_LossRate \times V\_PktpF},$$

where V_AIRF is the average video frame impairment rate, V_PktpF is the average quantity of packets included in each frame, and V_LossRate is the packet loss rate.

With reference to the second aspect or the first or the second possible implementation of the second aspect, in a third possible implementation of the second aspect, that the obtaining module calculates the sequence impairment rate by using the length of the group of pictures and the frame loss rate includes the obtaining module calculates the sequence impairment rate according to the following formula:

$$V\_IR = 1 - \frac{(1 - V\_LossRateFrame)}{V\_LossRateFrame \times GopLength} \times (1 - (1 - V\_LossRateFrame)^{GopLength}),$$

where V_IR is the sequence impairment rate, V_LossRateFrame is the frame loss rate, and Goplength is the length of the group of pictures.

With reference to any one of the second aspect or the first to the third possible implementations of the second aspect, in a fourth possible implementation of the second aspect, that the obtaining module calculates the packet-loss event frequency by using the total packet quantity of the sequence and the packet loss rate includes the obtaining module calculates the packet-loss event frequency according to the following formula:

$$V\_PLEF = \frac{TotalPktNum \times V\_LossRate}{V\_Burst},$$

where V_PLEF is the packet-loss event frequency, TotalPktNum is the total packet quantity of the sequence, V_LossRate is the packet loss rate, and V_Burst is a burst packet length of the video; or calculating the packet-loss event frequency according to the following formula:

$$V\_PLEF = \frac{TotalPktNum \times V\_LossRate}{V\_Burst} \times \frac{V\_Burst}{V\_PktpF} = \frac{TotalPktNum \times V\_LossRate}{V\_PktpF},$$

where V_PLEF is the packet-loss event frequency, TotalPktNum is the total packet quantity of the sequence, V_LossRate is the packet loss rate, V_Burst is a burst packet length of the video, and V_PktpF is the average quantity of packets included in each frame.

With reference to any one of the second aspect or the first to the fourth possible implementations of the second aspect, in a fifth possible implementation of the second aspect, the average quantity of packets included in each frame is a ratio of the total packet quantity of the sequence of the video to a total frame quantity of the sequence of the video.

With reference to any one of the second aspect or the first to the fifth possible implementations of the second aspect, in a sixth possible implementation of the second aspect, that the obtaining module obtains a frame loss rate of the video includes: the obtaining module obtains the packet loss rate and the average quantity of packets included in each frame, and calculates the frame loss according to the following formula:

$$V\_LossRateFrame = 1 - (1 - V\_LossRate)^{V\_PktpF},$$

where V_PktpF is the average quantity of packets included in each frame, V_LossRate is the packet loss rate, and V_LossRateFrame is the frame loss rate of the video.

According to the technical solutions provided in the present disclosure, it can be learned that, the present disclosure calculates, based on a fitting model and a probabilistic model, a statistic parameter relating to a specific video stream, so that video data quality estimation can be performed in an application scenario in which a specific video stream is unavailable.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present disclosure with reference to the accompanying drawings in the embodiments of the present disclosure.

It should be noted that in specific implementations provided in the present disclosure, parameters represented by using a same symbol may represent a same parameter, unless otherwise specified.

Figure 1:
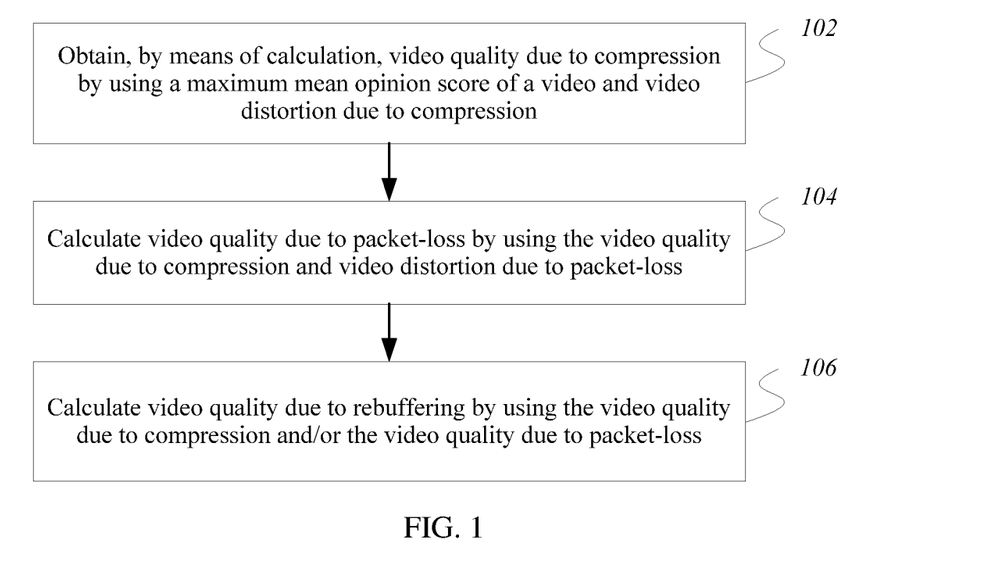
FIG. 1 is a video data quality estimation method according to an embodiment of the present disclosure.

FIG. 1 is a video data quality estimation method according to an embodiment of the present disclosure. Parameters in this method may be but are not limited to parameters in a P.1202.1 model. Steps of the method are as follows.

S102. Obtain, by means of calculation, video quality due to encoding by using a maximum mean opinion score of a video and video distortion due to encoding.

Optionally, the video quality due to encoding may be obtained according to the following formula:

$$V\_MOSC = MOS\_MAX - V\_DC,$$

where MOS_MAX is the maximum mean opinion score of the video, V_DC is the video distortion due to encoding, and V_MOSC is the video quality due to encoding.

Optionally, the video quality due to encoding may be obtained according to the following formula:

$$V\_MOSC = (MOS\_MAX - V\_DC) \cdot \left(1 + v_1 \cdot V\_CFF \cdot \log\left(\frac{1000}{videoFrameRate}\right)\right),$$

where V_CCF is a content complexity factor of the video, videoFrameRate is a frame rate of the video, and v1 is a preset coefficient value.

Optionally, in a specific implementation process, when the frame rate of the video is greater than or equal to 24, the video quality due to encoding may be obtained according to the following formula:

$$V\_MOSC = MOS\_MAX - V\_DC.$$

When the frame rate of the video is less than 24, the video quality due to encoding may be obtained according to the following formula:

$$V\_MOSC = (MOS\_MAX - V\_DC) \cdot \left(1 + v_1 \cdot V\_CFF \cdot \log\left(\frac{1000}{videoFrameRate}\right)\right).$$

Optionally, the distortion due to encoding V_DC may be obtained according to the following formula:

$$V\_DC = \frac{MOS\_MAX - MOS\_MIN}{1 + \left(\frac{V\_NBR}{v_3 \cdot V\_CCF + v_4}\right)^{(v_5 \cdot V\_CCF + v_6)}},$$

where MOS_MIN is a minimum mean opinion score of the video, V_NBR is a normalized bit rate, and v3, v4, v5, and v6 are preset coefficient values.

Optionally, the content complexity factor V_CCF may be obtained by means of calculation according to two parameters: the bit rate V_BR and an average quantity of bytes per I-frame V_ABIF, and a calculation formula is as follows:

$$V\_CCF = \mathrm{Min}\left(\sqrt{\frac{V\_BR}{V\_ABIF \cdot 15.0}},\ 1.0\right).$$

It should be noted that the video quality due to encoding V_MOSC may be directly used as the video quality V_MOS of the video, or is referred to as a mean opinion score of the video and is used for video data quality estimation.

S104. Calculate video quality due to packet-loss by using the video quality due to encoding and video distortion due to packet-loss.

Optionally, the video quality due to packet-loss may be obtained according to the following formula:

$$V\_MOSP = V\_MOSC - V\_DP,$$

where V_DP is the video distortion due to packet-loss, and V_MOSP is the video quality due to packet-loss.

Optionally, the distortion due to packet-loss V_DP may be obtained according to the following formula:

$$V\_DP = (V\_MOSC - MOS\_MIN) \times$$

$$\frac{\left(\frac{V\_AIRF \cdot V\_IR}{v_7 \cdot V\_CCF + v_8}\right)^{v_9} \times \left(\frac{V\_PLEF}{v_{10} \cdot V\_CCF + v_{11}}\right)^{v_{12}}}{1 + \left(\frac{V\_AIRF \cdot V\_IR}{v_7 \cdot V\_CCF + v_8}\right)^{v_9} \times \left(\frac{V\_PLEF}{v_{10} \cdot V\_CCF + v_{11}}\right)^{v_{12}}},$$

where V_AIRF is an average video frame impairment rate of the video, V_IR is a sequence impairment rate of the video, V_PLEF is a packet-loss event frequency of the video, and v7, v8, v9, v10, v11, and V12 are preset coefficient values.

Optionally, the distortion due to packet-loss may also be obtained according to the following formula:

$$V\_DP = (V\_MOSC - MOS\_MIN) \times$$

$$\frac{\left(\frac{V\_IR}{v_7 \cdot V\_CCF + v_8}\right)^{v_9} \times \left(\frac{V\_PLEF}{v_{10} \cdot V\_CCF + v_{11}}\right)^{v_{12}}}{1 + \left(\frac{V\_IR}{v_7 \cdot V\_CCF + v_8}\right)^{v_9} \times \left(\frac{V\_PLEF}{v_{10} \cdot V\_CCF + v_{11}}\right)^{v_{12}}}.$$

Optionally, in a specific implementation process, when an error concealment scheme VideoPLC of the video is SLICING, the distortion due to packet-loss may be obtained according to the following formula:

$$V\_DP = (V\_MOSC - MOS\_MIN) \times$$

$$\frac{\left(\frac{V\_AIRF \cdot V\_IR}{v_7 \cdot V\_CCF + v_8}\right)^{v_9} \times \left(\frac{V\_PLEF}{v_{10} \cdot V\_CCF + v_{11}}\right)^{v_{12}}}{1 + \left(\frac{V\_AIRF \cdot V\_IR}{v_7 \cdot V\_CCF + v_8}\right)^{v_9} \times \left(\frac{V\_PLEF}{v_{10} \cdot V\_CCF + v_{11}}\right)^{v_{12}}}.$$

When the error concealment scheme VideoPLC of the video is FREEZING, the distortion due to packet-loss may be obtained according to the following formula:

$$V\_DP = (V\_MOSC - MOS\_MIN) \times$$

$$\frac{\left(\frac{V\_IR}{v_7 \cdot V\_CCF + v_8}\right)^{v_9} \times \left(\frac{V\_PLEF}{v_{10} \cdot V\_CCF + v_{11}}\right)^{v_{12}}}{1 + \left(\frac{V\_IR}{v_7 \cdot V\_CCF + v_8}\right)^{v_9} \times \left(\frac{V\_PLEF}{v_{10} \cdot V\_CCF + v_{11}}\right)^{v_{12}}}.$$

Optionally, the average video frame impairment rate V_AIRF of the video may be obtained according to the following formula:

$$V\_AIRF = \frac{\sum_{i=1}^{V\_NDF} V\_IRpF_i}{V\_NDF},$$

where V_NDF is a quantity of damage frames of the video, and V_IRpFi is an average video frame impairment rate within the $i^{th}$ interval in a preset video frame set.

Optionally, the sequence impairment rate V_IR of the video may be obtained according to the following formula:

$$V\_IR = \frac{V\_NDF}{V\_TNF},$$

where V TNF is a total quantity of video frames in a video stream of the video.

The packet-loss event frequency V_PLEF may be analyzed according to a specific packet. When a packet loss occurs in a frame, a value of the packet-loss event frequency is increased by 1, and finally, the packet-loss event frequency is obtained by means of calculation.

It should be noted that the video quality due to packet-loss V_MOSP may be directly used as the video quality V_MOS of the video, or is referred to as a mean opinion score of the video and is used for video data quality estimation.

S106. Calculate video quality due to rebuffering by using the video quality due to encoding and/or the video quality due to packet-loss.

Optionally, a rebuffering model uses rebuffering times, a rebuffering time length, and a rebuffering interval between multiple times of rebuffering to measure impact due to rebuffering on video quality. The video quality due to rebuffering V_MOSR may be calculated according to the following formulas:

$$V\_MOSR = Video\_Quality - V\_DR, \text{ and}$$

$$V\_DR = (Video\_Qulity - MOS\_MIN) \times \frac{\left(\frac{NRE}{v_{13}}\right)^{v_{14}} \times \left(\frac{ARL}{v_{15}}\right)^{v_{16}} \times \left(\frac{MREEF}{v_{17}}\right)^{v_{18}}}{1 + \left(\frac{NRE}{v_{13}}\right)^{v_{14}} \times \left(\frac{ARL}{v_{15}}\right)^{v_{16}} \times \left(\frac{MREEF}{v_{17}}\right)^{v_{18}}},$$

where Video_Quality represents current video quality, NRE is a quantity of rebuffering events, ARL is an average rebuffering length, MREEF is a multi-rebuffering event impact factor, and v13, v14, v15, v16, v17, and v18 are preset coefficient values.

Optionally, in a specific implementation process, the current video quality needs to be determined according to a channel status. When a packet loss and rebuffering both occur, a value of Video_Quality is the video quality due to packet-loss; when neither packet loss nor rebuffering occurs, a value of Video_Quality is the video quality due to encoding.

The video quality due to rebuffering V_MOSR may be directly used as the video quality V_MOS of the video, or is referred to as a mean opinion score of the video and is used for video data quality estimation.

In the present disclosure, models are classified into a quality model due to encoding, a quality model due to packet-loss, and a quality model due to rebuffering. This manner can effectively reflect impact of quality due to encoding on video quality.

Figure 2:
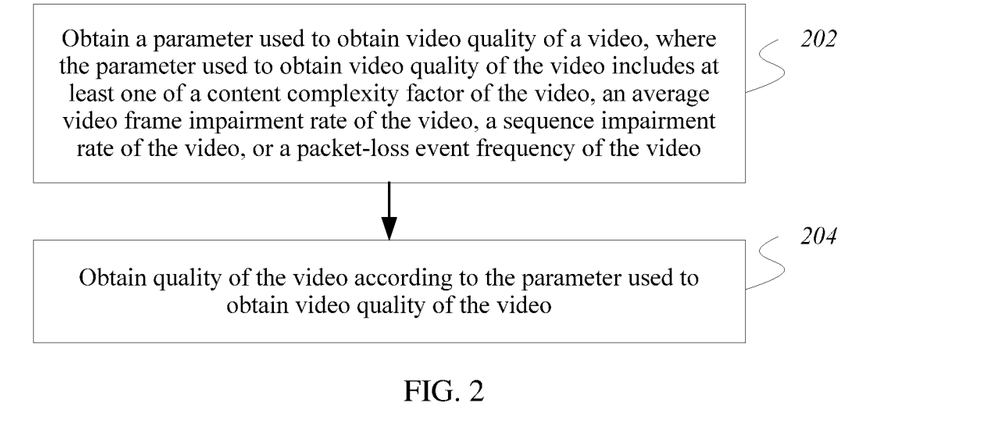
FIG. 2 is another video data quality estimation method according to an embodiment of the present disclosure.

With reference to the video data quality estimation method in FIG. 1, an embodiment of the present disclosure provides another video data quality estimation method. As shown in FIG. 2, this method can be considered as an adjustment of the P.1202.1 model. A simplified model is searched according to a parameter available at a planning layer. That is, for parameters unavailable in the P.1202.1 model, such as a content complexity factor of a video, an average video frame impairment rate of the video, a sequence impairment rate of the video, and a packet-loss event frequency of the video, a parameter at the planning layer is used with reference to a probabilistic model to obtain a parameter in a P.1201.1 model by means of deduction and mapping, thereby implementing quality estimation. Steps of the method are as follows.

S202. Obtain a parameter used to obtain video quality of the video, where the parameter used to obtain video quality of the video includes at least one of a content complexity factor of the video, an average video frame impairment rate of the video, a sequence impairment rate of the video, or a packet-loss event frequency of the video.

Optionally, a process of obtaining the content complexity factor of the video may be: obtaining a bit rate of the video, and calculating the content complexity factor by using the bit rate. In a specific implementation process, the content complexity factor may be calculated according to the following formula:

$$V\_CCF = \begin{cases} a\ln V\_BR + b & \text{if } V\_BR < \text{Threshold} \\ c & \text{if } V\_BR \geq \text{Threshold} \end{cases}.$$

V_CCF is the content complexity factor, V_BR is the bit rate, a is a preset value, b is a preset value, c is a preset value, and Threshold is a preset value or a value obtained by multiplying a height of the video by a width of the video. The values of a, b, c, and Threshold may be obtained by means of fitting training or by querying Table 1. Alternatively, the value of Threshold may be obtained by multiplying the height of the video by the width of the video, or the value of Threshold may be obtained by means of calculation by using resolution of the video, and a calculation formula may be:

$$\text{Threshold} = \text{Width} \times \text{Height} \times d = \text{Resolution} \times d$$

where Width is the width of the video, Height is the height of the video, Resolution is the resolution of the video, d is a preset coefficient value, and a value of d may be obtained by means of fitting training or by querying Table 2.

TABLE 1

Coefficients for the content complexity factor V_CCF

|  | H264 | | | MPEG4 | |
| --- | --- | --- | --- | --- | --- |
|  | QCIF | QVGA | HVGA | QCIF | QVGA |
| a | 0.1077 | 0.0975 | 0.0908 | 0.1155 | 0.1129 |
| b | 0.0207 | 0.0001 | 0.0001 | 0.0994 | 0.0931 |
| c | 0.91 | 0.85 | 0.86 | 0.90 | 0.90 |
| Threshold | 800 | 1600 | 3200 | 300 | 600 |

TABLE 2

Coefficient d for the content complexity factor V_CCF

|  | H264 | MPEG4 |
| --- | --- | --- |
| d | 0.02 | 0.012 |

Optionally, a process of obtaining the average video frame impairment rate of the video may be: obtaining a packet loss rate of the video and an average quantity of packets included in each frame of the video, and calculating the average video frame impairment rate by using the packet loss rate and the average quantity of packets included in each frame. In a specific implementation process, the average video frame impairment rate may be calculated according to the following formula:

$$V\_AIRF = \frac{1}{1 - (1 - V\_LossRate)^{V\_PktpF}} - \frac{1 - V\_LossRate}{V\_LossRate \times V\_PktpF},$$

where V_AIRF is the average video frame impairment rate, V_PktpF is the average quantity of packets included in each frame, and V_LossRate is the packet loss rate.

Optionally, a process of obtaining the sequence impairment rate of the video may be: obtaining a length of a group of pictures of the video, obtaining a frame loss rate of the video, and calculating the sequence impairment rate by using the length of the group of pictures and the frame loss rate. In a specific implementation process, the sequence impairment rate may be calculated according to the following formula:

$$V\_IR = 1 - \frac{(1 - V\_LossRateFrame)}{V\_LossRateFrame \times GopLength} \times (1 - (1 - V\_LossRateFrame)^{GopLength}),$$

where

V_IR is the sequence impairment rate, V_LossRateFrame is the frame loss rate, and Goplength is the length of the group of pictures.

Optionally, a process of obtaining the packet-loss event frequency of the video may be: obtaining a total packet quantity of a sequence of the video and the packet loss rate of the video, and calculating the packet-loss event frequency by using the total packet quantity of the sequence and the packet loss rate. In a specific implementation process, the packet-loss event frequency may be calculated according to the following formula:

$$V\_PLEF = \frac{TotalPktNum \times V\_LossRate}{V\_Burst},$$

where V_PLEF is the packet-loss event frequency, TotalPktNum is the total packet quantity of the sequence, V_LossRate is the packet loss rate, and V_Burst is a burst packet length of the video; or the packet-loss event frequency is calculated according to the following formula:

$$V\_PLEF = \frac{TotalPktNum \times V\_LossRate}{V\_Burst} \times \frac{V\_Burst}{V\_PktpF} = \frac{TotalPktNum \times V\_LossRate}{V\_PktoF},$$

where V_PLEF is the packet-loss event frequency, TotalPktNum is the total packet quantity of the sequence, V_LossRate is the packet loss rate, V_Burst is a burst packet length of the video, and V_PktpF is the average quantity of packets included in each frame.

Optionally, in a specific implementation process, a ratio V_Burst/V_PktpF of the burst packet length of the video to the average quantity of packets included in each frame may be set to V_ratio. When V_ratio is less than 1, the packet-loss event frequency may be calculated according to the following formula:

$$V\_PLEF = \frac{TotalPktNum \times V\_LossRate}{V\_Burst}.$$

When V_ratio is greater than or equal to 1, the packet-loss event frequency may be calculated according to the following formula:

$$V\_PLEF = \frac{TotalPktNum \times V\_LossRate}{V\_Burst} \times V\_ratio.$$

Optionally, the average quantity of packets included in each frame V_PktpF may be a ratio of the total packet quantity TotalPktNum of the sequence of the video to a total frame quantity TotalFrameNum of the sequence of the video. A value of the total frame quantity TotalFrameNum of the sequence of the video may be a value of a product of a frame rate videoFrameRate of the video and a time length MeasureTime of the video.

Optionally, a process of obtaining the frame loss rate of the video may be: obtaining the packet loss rate and the average quantity of packets included in each frame, and calculating the frame loss according to the following formula:

$$V\_LossRateFrame = 1 - (1 - V\_LossRate)^{V\_PktpF},$$

where V_PktpF is the average quantity of packets included in each frame, V_LossRate is the packet loss rate, and V_LossRateFrame is the frame loss rate of the video.

S204. Obtain quality of the video according to the parameter used to obtain video quality of the video.

A detailed process of obtaining the quality of the video according to the parameter used to obtain video quality of the video has been described in detail in the specific implementation of FIG. 1. Details are not further described herein.

The present disclosure provides an effective method for objectively measuring video quality, and resolves a series of problems such as high complexity of subjective estimation, high costs, and possible damages caused to a human body.

According to the present disclosure, impact of quality due to encoding on video quality can be effectively reflected. In addition, a channel parameter is fully utilized. The channel parameter or available data at a network planning layer is transformed into a bitstream parameter mandatorily used for video quality estimation, and a probabilistic model is used to calculate impact of a packet loss on a video. In this way, video data quality estimation can be performed in an application scenario in which a specific video stream is unavailable, which is more practical.

In addition, in the present disclosure, people's psychological feelings of watching a video are fully taken into consideration, and the estimation method, by virtue of simplicity and reliability, can positively guide a service provider to provide a better video quality service.

A related apparatus configured to implement the foregoing solutions is further provided in the following.

Figure 3:
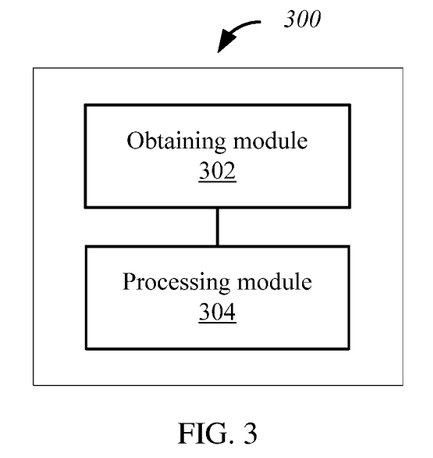
FIG. 3 is a video data quality estimation apparatus according to an embodiment of the present disclosure.

Referring to FIG. 3, an embodiment of the present disclosure further provides a video data quality estimation apparatus 300, including an obtaining module 302 and a processing module 304.

The obtaining module 302 is configured to obtain a parameter used to obtain video quality of the video. The parameter used to obtain video quality of the video includes at least one of a content complexity factor of the video, an average video frame impairment rate of the video, a sequence impairment rate of the video, or a packet-loss event frequency of the video.

Optionally, that the obtaining module 302 obtains the content complexity factor of the video may be: obtaining a bit rate of the video, and calculating the content complexity factor by using the bit rate. In a specific implementation process, the content complexity factor may be calculated according to the following formula:

$$V\_CCF = \begin{cases} a \ln V\_BR + b & \text{if } V\_BR < \text{Threshold} \\ c & \text{if } V\_BR \geq \text{Threshold} \end{cases},$$

where V_CCF is the content complexity factor, V_BR is the bit rate, a is a preset value, b is a preset value, c is a preset value, and Threshold is a preset value or a value obtained by multiplying a height of the video by a width of the video.

Optionally, that the obtaining module 302 obtains the average video frame impairment rate may be: obtaining a packet loss rate of the video and an average quantity of packets included in each frame of the video, and calculating the average video frame impairment rate by using the packet loss rate and the average quantity of packets included in each frame. In a specific implementation process, the average video frame impairment rate may be calculated according to the following formula:

$$\text{V\_AIRF} = \frac{1}{1-(1-\text{V\_LossRate})^{V\_PktpF}} - \frac{1-\text{V\_LossRate}}{\text{V\_LossRate} \times \text{V\_PktpF}},$$

where V_AIRF is the average video frame impairment rate, V_PktpF is the average quantity of packets included in each frame, and V_LossRate is the packet loss rate.

Optionally, that the obtaining module 302 obtains the sequence impairment rate may be: obtaining a length of a group of pictures of the video, obtaining a frame loss rate of the video, and calculating the sequence impairment rate by using the length of the group of pictures and the frame loss rate. In a specific implementation process, the sequence impairment rate may be calculated according to the following formula:

$$\text{V\_IR} = 1 - \frac{(1-\text{V\_LossRateFrame})}{\text{V\_LossRateFrame} \times GopLength} \times (1-(1-\text{V\_LossRateFrame})^{GopLength}),$$

where V_IR is the sequence impairment rate, V_LossRateFrame is the frame loss rate, and Goplength is the length of the group of pictures.

Optionally, that the obtaining module 302 obtains the packet-loss event frequency may be: obtaining a total packet quantity of a sequence of the video and the packet loss rate of the video, and calculating the packet-loss event frequency by using the total packet quantity of the sequence and the packet loss rate. In a specific implementation process, the packet-loss event frequency may be calculated according to the following formula:

$$\text{V\_PLEF} = \frac{TotalPktNum \times \text{V\_LossRate}}{\text{V\_Burst}},$$

where V_PLEF is the packet-loss event frequency, TotalPktNum is the total packet quantity of the sequence, V_LossRate is the packet loss rate, and V_Burst is a burst packet length of the video; or the packet-loss event frequency is calculated according to the following formula:

$$\text{V\_PLEF} = \frac{TotalPktNum \times \text{V\_LossRate}}{\text{V\_Burst}} \times \frac{\text{V\_Burst}}{\text{V\_PktpF}} = \frac{TotalPktNum \times \text{V\_LossRate}}{\text{V\_PktoF}},$$

where V_PLEF is the packet-loss event frequency, TotalPktNum is the total packet quantity of the sequence, V_LossRate is the packet loss rate, V_Burst is a burst packet length of the video, and V_PktpF is the average quantity of packets included in each frame.

Optionally, the average quantity of packets included in each frame V_PktpF may be a ratio of the total packet quantity TotalPktNum of the sequence of the video to a total frame quantity TotalFrameNum of the sequence of the video.

Optionally, that the obtaining module 302 obtains the frame loss rate of the video may be: obtaining the packet loss rate and the average quantity of packets included in each frame, and calculating the frame loss according to the following formula:

$$\text{V\_LossRateFrame} = 1-(1-\text{V\_LossRate})^{V\_PktpF},$$

where V_PktpF is the average quantity of packets included in each frame, V_LossRate is the packet loss rate, and V_LossRateFrame is the frame loss rate of the video.

The processing module 304 is configured to obtain quality of the video according to the parameter that is used to obtain video quality of the video and that is obtained by the obtaining module 302.

It can be understood that functions of the functional units of the video data quality estimation apparatus 300 in this embodiment can be implemented according to the methods in the foregoing method embodiments. For specific implementation processes of the functional units, refer to related descriptions in the method embodiments. Details are not further described herein. The video data quality estimation apparatus 300 may be any apparatus that needs to output and play a video, for example, a device such as a notebook computer, a tablet computer, a personal computer, or a mobile phone.

The present disclosure provides an effective apparatus for objectively measuring video quality, and resolves a series of problems such as high complexity of subjective estimation, high costs, and possible damages caused to a human body.

The video data quality estimation apparatus 300 provided in this embodiment of the present disclosure can effectively reflect impact of quality due to encoding on video quality. In addition, a channel parameter is fully utilized. The channel parameter or available data at a network planning layer is transformed into a bitstream parameter mandatorily used for video quality estimation, and a probabilistic model is used to calculate impact of a packet loss on a video. In this way, video data quality estimation can be performed in an application scenario in which a specific video stream is unavailable, which is more practical.

Figure 4:
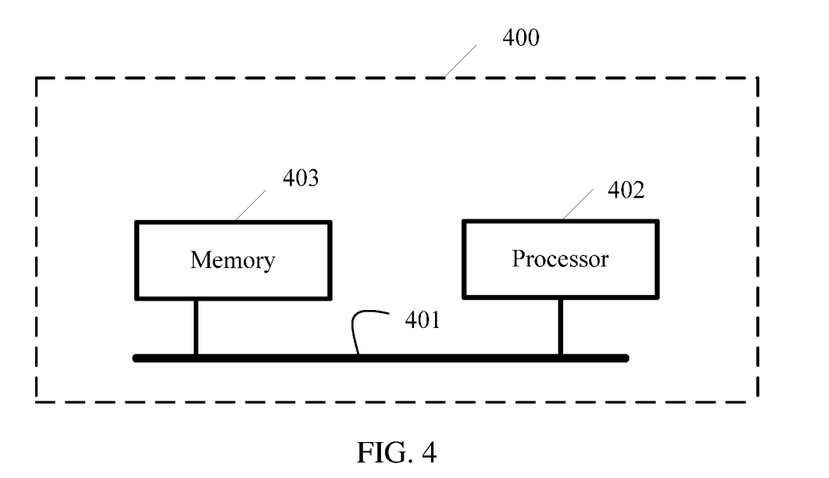
FIG. 4 is another video data quality estimation apparatus according to an embodiment of the present disclosure.

Referring to FIG. 4, FIG. 4 is a schematic diagram of a video data quality estimation apparatus 400 according to an embodiment of the present disclosure. The video data quality estimation apparatus 400 may include at least one bus 401, at least one processor 402 connected to the bus 401, and at least one memory 403 connected to the bus 401.

The processor 402 invokes, by using the bus 401, code or an instruction stored in the memory 403, to obtain a parameter used to obtain video quality of the video, where the parameter used to obtain video quality of the video includes at least one of a content complexity factor of a video, an average video frame impairment rate of the video, a sequence impairment rate of the video, or a packet-loss event frequency of the video; and obtain quality of the video according to the parameter used to obtain video quality of the video.

Optionally, in terms of obtaining the content complexity factor of the video, the processor 402 may be configured to obtain a bit rate of the video, and calculate the content complexity factor by using the bit rate. In a specific implementation process, the content complexity factor may be calculated according to the following formula:

$$V\_CCF = \begin{cases} a \ln V\_BR + b & \text{if } V\_BR < \text{Threshold} \\ c & \text{if } V\_BR \geq \text{Threshold} \end{cases},$$

where V_CCF is the content complexity factor, V_BR is the bit rate, a is a preset value, b is a preset value, c is a preset value, and Threshold is a preset value or a value obtained by multiplying a height of the video by a width of the video.

Optionally, in terms of obtaining the average video frame impairment rate of the video, the processor 402 may be configured to: obtain a packet loss rate of the video and an average quantity of packets included in each frame of the video, and calculate the average video frame impairment rate by using the packet loss rate and the average quantity of packets included in each frame. In a specific implementation process, the average video frame impairment rate may be calculated according to the following formula:

$$V\_AIRF = \frac{1}{1-(1-V\_LossRate)^{V\_PktpF}} - \frac{1-V\_LossRate}{V\_LossRate \times V\_PktpF},$$

where V_AIRF is the average video frame impairment rate, V_PktpF is the average quantity of packets included in each frame, and V_LossRate is the packet loss rate.

Optionally, in terms of obtaining the sequence impairment rate of the video, the processor 402 may be configured to: obtain a length of a group of pictures of the video, obtain a frame loss rate of the video, and calculate the sequence impairment rate by using the length of the group of pictures and the frame loss rate. In a specific implementation process, the sequence impairment rate may be calculated according to the following formula:

$$V\_IR = 1 - \frac{(1-V\_LossRateFrame)}{V\_LossRateFrame \times GopLength} \times (1-(1-V\_LossRateFrame)^{GopLength}),$$

where V_IR is the sequence impairment rate, V_LossRateFrame is the frame loss rate, and Goplength is the length of the group of pictures.

Optionally, in terms of obtaining the packet-loss event frequency of the video, the processor 402 may be configured to: obtain a total packet quantity of a sequence of the video and the packet loss rate of the video, and calculate the packet-loss event frequency by using the total packet quantity of the sequence and the packet loss rate. In a specific implementation process, the packet-loss event frequency may be calculated according to the following formula:

$$V\_PLEF = \frac{TotalPktNum \times V\_LossRate}{V\_Burst},$$

where V_PLEF is the packet-loss event frequency, TotalPktNum is the total packet quantity of the sequence, V_LossRate is the packet loss rate, and V_Burst is a burst packet length of the video; or the packet-loss event frequency is calculated according to the following formula:

$$V\_PLEF = \frac{TotalPktNum \times V\_LossRate}{V\_Burst} \times \frac{V\_Burst}{V\_PktpF} = \frac{TotalPktNum \times V\_LossRate}{V\_PktpF},$$

where V_PLEF is the packet-loss event frequency, TotalPktNum is the total packet quantity of the sequence, V_LossRate is the packet loss rate, V_Burst is a burst packet length of the video, and V_PktpF is the average quantity of packets included in each frame.

Optionally, the average quantity of packets included in each frame V_PktpF may be a ratio of the total packet quantity TotalPktNum of the sequence of the video to a total frame quantity TotalFrameNum of the sequence of the video.

Optionally, in terms of obtaining the frame loss rate of the video, the processor 402 may be configured to: obtain the packet loss rate and the average quantity of packets included in each frame, and calculate the frame loss according to the following formula:

$$V\_LossRateFrame = 1-(1-V\_LossRate)^{V\_PktpF},$$

where V_PktpF is the average quantity of packets included in each frame, V_LossRate is the packet loss rate, and V_LossRateFrame is the frame loss rate of the video.

A detailed process of obtaining the quality of the video according to the parameter used to obtain video quality of the video has been described in detail in the specific implementations of FIG. 1 and FIG. 2. Details are not further described herein.

It can be understood that functions of the functional units of the video data quality estimation apparatus 400 in this embodiment can be implemented according to the methods in the foregoing method embodiments. For specific implementation processes of the functional units, refer to related descriptions in the method embodiments. Details are not further described herein. The video data quality estimation apparatus 400 may be any apparatus that needs to output and play a video, for example, a device such as a notebook computer, a tablet computer, a personal computer, or a mobile phone.

The present disclosure provides an effective apparatus for objectively measuring video quality, and resolves a series of problems such as high complexity of subjective estimation, high costs, and possible damages caused to a human body.

The video data quality estimation apparatus 400 provided in this embodiment of the present disclosure can effectively reflect impact of quality due to encoding on video quality. In addition, a channel parameter is fully utilized. The channel parameter or available data at a network planning layer is transformed into a bitstream parameter mandatorily used for video quality estimation, and a probabilistic model is used to calculate impact of a packet loss on a video. In this way, video data quality estimation can be performed in an application scenario in which a specific video stream is unavailable, which is more practical.

The embodiments of the present disclosure further provide a computer storage medium. The computer storage medium may store a program. When the program is executed, some or all of the steps of any video data quality estimation method in the foregoing method embodiments are performed.

In the foregoing embodiments, the description of each embodiment has respective focuses. For a part that is not described in detail in an embodiment, reference may be made to related descriptions in other embodiments.

It should be noted that, to make the description brief, the foregoing method embodiments are expressed as a series of actions. However, a person skilled in the art should appreciate that the present disclosure is not limited to the described action sequence, because according to the present disclosure, some steps may be performed in other sequences or performed simultaneously. In addition, a person skilled in the art should also appreciate that all the embodiments described in this specification are example embodiments, and the related actions and modules are not necessarily mandatory to the present disclosure.

Content such as information exchange and an execution process between the modules in the apparatus is based on a same idea as the method embodiments of the present disclosure. Therefore, for detailed content, refer to descriptions in the method embodiments of the present disclosure, and details are not further described herein.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), or a random access memory (RAM).

Specific examples are used in this specification to describe the principle and implementations of the present disclosure. The descriptions of the foregoing embodiments are merely intended to help understand the method and idea of the present disclosure. In addition, with respect to the implementations and the application scope, modifications may be made by a person of ordinary skill in the art according to the idea of the present disclosure. Therefore, this specification shall not be construed as a limitation on the present disclosure.

What is claimed is:

1. A method comprising:
obtaining a parameter for obtaining video quality of a video, wherein the parameter for obtaining the video quality of the video comprises an average video frame impairment rate of the video; and
obtaining quality of the video according to the parameter for obtaining the video quality of the video, wherein obtaining the parameter for obtaining the video quality of the video comprises:
obtaining a packet loss rate of the video and an average quantity of packets comprised in each frame of the video, and calculating the average video frame impairment rate using the packet loss rate and the average quantity of packets comprised in each frame, wherein calculating the average video frame impairment rate using the packet loss rate and the average quantity of packets comprised in each frame comprises calculating the average video frame impairment rate according to following relation:

$$V\_AIRF = \frac{1}{1-(1-V\_LossRate)^{V\_PktpF}} - \frac{1-V\_LossRate}{V\_LossRate \times V\_PktpF},$$

wherein V_AIRF is the average video frame impairment rate, V_PktpF is the average quantity of packets comprised in each frame, and V_LossRate is the packet loss rate.

2. The method according to claim 1, wherein the average quantity of packets comprised in each frame is a ratio of a total packet quantity of a sequence of the video to a total frame quantity of the sequence of the video.

3. The method according to claim 1, wherein the parameter for obtaining the video quality of the video further comprises a sequence impairment rate of the video, and obtaining the parameter for obtaining the video quality of the video further comprises:
obtaining a length of a group of pictures of the video and obtaining a frame loss rate of the video, and calculating the sequence impairment rate using the length of the group of pictures and the frame loss rate; and
wherein obtaining the frame loss rate of the video comprises obtaining the packet loss rate and the average quantity of packets comprised in each frame, and calculating the frame loss rate according to following relation:

$$V\_LossRateFrame = 1 - (1 - V\_LossRate)^{V\_PktpF},$$

wherein V_PktpF is the average quantity of packets comprised in each frame, V_LossRate is the packet loss rate, and V_LossRateFrame is the frame loss rate of the video.

4. An apparatus comprising:
a processor; and
a computer-readable storage medium storing a program to be executed by the processor, the program including instructions for:
obtaining a parameter for obtaining video quality of a video, wherein the parameter for obtaining the video quality of the video comprises an average video frame impairment rate of the video; and
obtaining quality of the video according to the parameter for obtaining the video quality of the video, wherein obtaining the parameter for obtaining the video quality of the video comprises:
obtaining a packet loss rate of the video and an average quantity of packets comprised in each frame of the video, and calculating the average video frame impairment rate using the packet loss rate and the average quantity of packets comprised in each frame, wherein the instructions for calculating the average video frame impairment rate using the packet loss rate and the average quantity of packets comprised in each frame comprise instructions for calculating the average video frame impairment rate according to following relation:

$$V\_AIRF = \frac{1}{1-(1-V\_LossRate)^{V\_PktpF}} - \frac{1-V\_LossRate}{V\_LossRate \times V\_PktpF},$$

wherein V_AIRF is the average video frame impairment rate, V_PktpF is the average quantity of packets comprised in each frame, and V_LossRate is the packet loss rate.

5. The apparatus according to claim 4, wherein the average quantity of packets comprised in each frame is a ratio of a total packet quantity of a sequence of the video to a total frame quantity of the sequence of the video.

6. The apparatus according to claim 4, wherein the parameter for obtaining the video quality of the video further comprises a sequence impairment rate of the video, and obtaining the parameter for obtaining the video quality of the video further comprises:

obtaining a length of a group of pictures of the video and obtaining a frame loss rate of the video, and calculating the sequence impairment rate using the length of the group of pictures and the frame loss rate; and wherein obtaining the frame loss rate of the video comprises instructions for obtaining the packet loss rate and the average quantity of packets comprised in each frame, and calculating the frame loss rate according to following relation:

$$V\_LossRateFrame = 1-(1-V\_LossRate)^{V\_PktPF},$$

wherein V_PktpF is the average quantity of packets comprised in each frame, V_LossRate is the packet loss rate, and V_LossRateFrame is the frame loss rate of the video.

7. A non-transitory computer-readable media storing computer instructions, that when executed by one or more processors, cause the one or more processors to perform steps:

obtaining a parameter for obtaining video quality of a video, wherein the parameter for obtaining the video quality of the video comprises an average video frame impairment rate of the video; and obtaining quality of the video according to the parameter for obtaining the video quality of the video, wherein obtaining the parameter for obtaining the video quality of the video comprises:

obtaining a packet loss rate of the video and an average quantity of packets comprised in each frame of the video, and calculating the average video frame impairment rate using the packet loss rate and the average quantity of packets comprised in each frame, wherein calculating the average video frame impairment rate using the packet loss rate and the average quantity of packets comprised in each frame comprises calculating the average video frame impairment rate according to following relation:

$$V\_AIRF = \frac{1}{1-(1-V\_LossRate)^{V\_PktpF}} - \frac{1-V\_LossRate}{V\_LossRate \times V\_PktpF},$$

wherein V_AIRF is the average video frame impairment rate, V_PktpF is the average quantity of packets comprised in each frame, and V_LossRate is the packet loss rate.

8. The non-transitory computer-readable media according to claim 7, wherein the average quantity of packets comprised in each frame is a ratio of a total packet quantity of a sequence of the video to a total frame quantity of the sequence of the video.

* * * * *

UNITED STATES PATENT AND TRADEMARK OFFICE
CERTIFICATE OF CORRECTION

PATENT NO. : 10,530,675 B2
APPLICATION NO. : 15/796035
DATED : January 7, 2020
INVENTOR(S) : Shan Gao et al.

It is certified that error appears in the above-identified patent and that said Letters Patent is hereby corrected as shown below:

In the Claims

In Column 19, Line 6, Claim 6, delete "instructions for".

In Column 19, Line 18, Claim 7, delete "steps:" and insert --steps of:--.

Signed and Sealed this
Seventh Day of July, 2020

Andrei Iancu
*Director of the United States Patent and Trademark Office*